Dec. 21, 1926.

F. BISHOP

WEEDER AND CULTIVATOR

Filed March 31, 1926

1,611,508

Inventor:
Frank Bishop,
By N.W. Crandall
Attorney.

Patented Dec. 21, 1926.

1,611,508

UNITED STATES PATENT OFFICE.

FRANK BISHOP, OF LOS ANGELES, CALIFORNIA.

WEEDER AND CULTIVATOR.

Application filed March 31, 1926. Serial No. 98,781.

My invention relates to improvements in weeders and cultivators in which a forwardly curved sharp edged tooth is employed and is especially adapted for cutting weeds and grass of the specie of vegetation commonly termed devil grass and the like, such as the dodder, bindweed and the creeping crowfoot, all of which are very troublesome in many sections of the United States, since they are of a creeping variety, and so interweave and form a mat which excludes light and air from the soil and chokes out blue grass and clover from lawns, and is also very troublesome to the truck gardener and other agricultural and horticultural pursuits.

In this specification, and the drawing, I shall describe and illustrate a preferred form of my invention, and specifically mention certain of its more important objects.

I do not limit myself to the forms disclosed, since various changes and adaptations may be made therein without departing from the essence of the invention as hereinafter claimed; and objects and advantages, other than those specifically mentioned, are included within its scope.

This invention relates more particularly to weeders and cultivators of the hand type, and among its principal objects are; first, to provide an easy and convenient means of assembling the device and second, to provide a simple and convenient means of removing and replacing the teeth of the device when they become impaired, broken or require sharpening; third, to form a tooth in such shape and manner, that while it is formed of very thin material, that it shall have great resistance to side strain, bending or breakage; fourth, to accomplish these objects by means of a very simple and inexpensive construction.

These objects are attained in the manner illustrated in the accompanying drawing, in which—

Similar characters of reference denote like parts throughout the several views.

Figure 1:
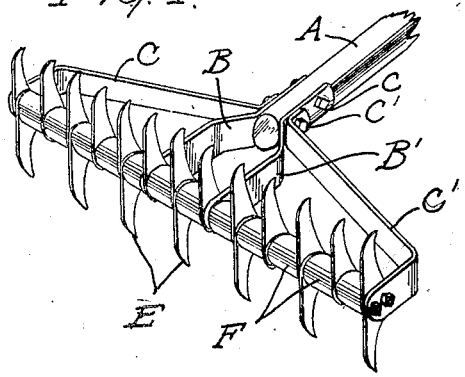
Figure 1 is a perspective of one form of my device having teeth extending in opposite directions, each set of teeth having a different spacing, the handle being broken away.

Referring to Fig. 1 of the drawing, A is a handle of suitable material and length; B, B' are off-set members each a counterpart of the other, and provided with perforations $a$, $a'$ near one end and perforations $b$, $b'$ near the opposite end thereof, all of said perforations being in longitudinal alignment with each other and centrally of the width of said members B, and B'.

Members C and C' are also off-set and provided with one perforation near one end, and two perforations near the opposite end thereof, and centrally of the width thereof, and in longitudinal alignment with each other.

Figure 2:
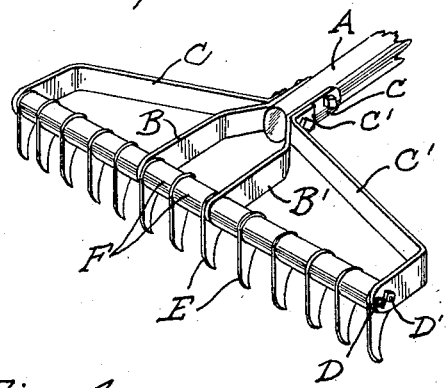
Fig. 2 is a perspective of another form which my device may assume, having a single row of teeth, the handle also broken away.

The members B and B' and C and C' are secured to one end of the handle, one of each upon opposite sides of the handle as shown in Figs. 1 and 2, by machine screws $c$ and $c'$ or other suitable means.

The two perforations in the outer ends of the members B and B' and C and C' are arranged in alignment with each other, so that the bolts D and D' may be passed freely therethrough.

Figure 3:
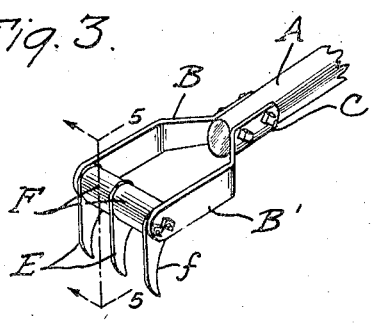
Fig. 3 is a perspective of still another form which my device may assume and is especially adapted for use in horticultural and garden work, the handle also being broken away.
Figure 4:
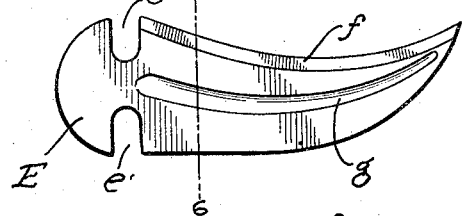
Fig. 4 is a side view of a tooth, which is identical in every form which my device may assume.
Figure 6:
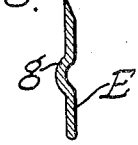
Fig. 6 is a cross section of Fig. 4, taken on line 6, 6.

The teeth of the device are formed of any suitable sheet material, and are curved as illustrated in Figs. 1, 2, 3, 4, 5 and 7, and the forward concaved edge is sharpened or ground upon one side only as shown at $f$, in Fig. 4. The teeth are also provided with a reinforcement in the curved bead $g$, shown in Figs. 4, 5 and 7 and they are also provided with slots $e$ and $e'$ upon opposite sides of the base of the teeth as shown in the figures last referred to.

Figure 7:
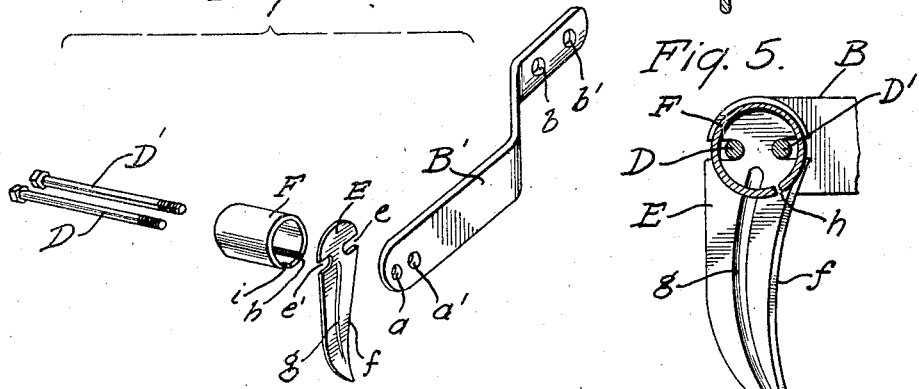
Fig. 7 is a view of the several parts, with the exception of the members C and C', so placed as to illustrate the assembly of the device.
Figure 5:
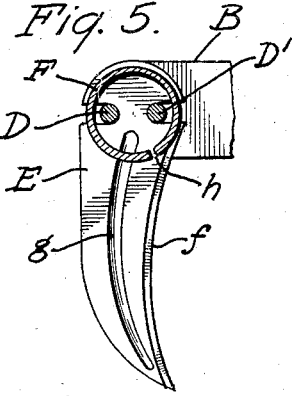
Fig. 5 is a cross section of Fig. 4, taken on line 5, 5, looking in the direction of the arrows.

The spacing bushings F, are best illustrated in Fig. 7, and are formed of any suitable material, preferably of sheet steel, and is rolled into a tube as shown in Figs. 5 and 7. The seam is shown at $h$ in Figs. 5 and 7; it is also provided with a groove $i$, in one end thereof as shown in Fig. 7, and is adapted to fit over the bead $g$, in the tooth E, in the assembly as shown in Fig. 5.

The groove $i$, is also clearly shown in Fig. 7.

Referring to Fig. 1, to assemble the device, bolts D and D' are passed through the perforations in the outer end of the member C, then through the slots $e$ and $e'$ in one of the teeth, the tooth extending upward with the sharp concaved edge of the tooth facing toward the handle, then through another tooth, the tooth extending downward with the sharp concaved edge facing toward the handle, then a spacing bushing is next placed in position so that the groove $i$ engages the bead $g$, and the bolts D and D' are then passed therethrough, then another tooth is positioned extending upwardly with the sharp edge facing toward the handle and the bolts advanced therethrough, and again another spacing bushing is positioned and the bolts again advanced therethrough. The routine is then repeated until the member B is reached when the bolts are passed through the perforations in the end thereof, thereafter the setting of the teeth and spacing bushings continues until the member B' is reached and the bolts passed therethrough, after which the routine of setting the teeth and spacing bushings continues until the bolts are passed through the perforations in the end of the member C' when the threaded ends of the bolts are passed therethrough and ordinary commercial nuts (not shown,) are screwed thereon and the whole structure cinched up to the desired tension.

In assembling other forms of my device as shown in Figs. 2 and 3 it is obvious that the same routine will apply, except that the teeth will be extended in one direction only, as shown in Figs. 2 and 3.

It will be observed by referring to Fig. 1, that the teeth upon one side of the head are spaced double the distance of those upon the opposite side, this spacing may be varied to suit the various requirements of the trade.

It will be seen that by loosening the nut upon one of the bolts designated as D, and removing the bolt D' entirely from its position that any of the teeth may be readily removed from the structure and replaced by others where the teeth have become impaired, bent, broken or where the original ones have become dull and require grinding or sharpening, and after such replacement the bolt D' may be replaced and the nuts tightened to hold the parts firmly in place.

Having thus described my invention, what I claim and desire to secure by Letters Patent is—

1. In a weeder and cultivator, a tooth formed from sheet metal having a convexly curved edge, and a semi-circular base portion, open end slots on opposite sides of said base, and a raised rib upon one side of said tooth extending lengthwise of the tooth and centrally between the edges thereof to reinforce and strengthen said tooth.

2. In a device of the character described, a handle carrying a multiplicity of bail members, bolts passing through the outer ends of said bail members, curved cutting teeth provided with open end slots in the base thereof for the reception of said bolts, spacing collars upon said bolts between said teeth and means for binding said teeth and said collars firmly between said bail members.

3. A device of the character described comprising; a handle provided with bail members; a pair of spaced parallel bolts spanning the outer ends of said bail members; cutting teeth having opposed open-end slots in their base portions respectively engaging said bolts; spacing collars upon said bolts between said teeth; and means for clamping said teeth and said collars between said bail members.

FRANK BISHOP.